Jan. 27, 1970  E. V. CARLSON  3,491,436
METHOD OF CONNECTING DRIVE PIN TO AN ARMATURE
OF AN ELECTROACOUSTIC TRANSDUCER
Original Filed Aug. 20, 1964  3 Sheets-Sheet 1
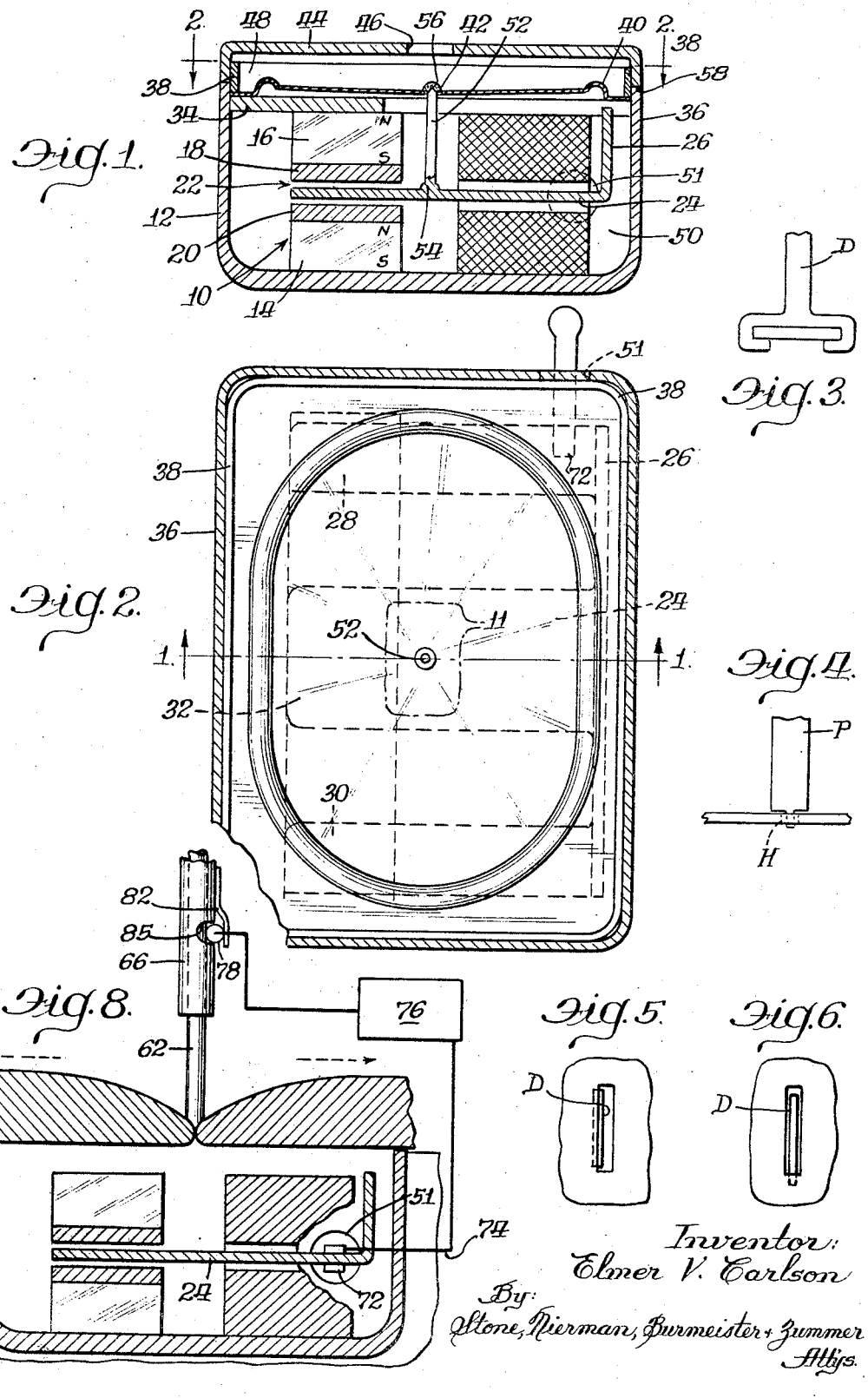
Inventor:
Elmer V. Carlson
By:
Stone, Nierman, Burmeister + Zummer
Attys.

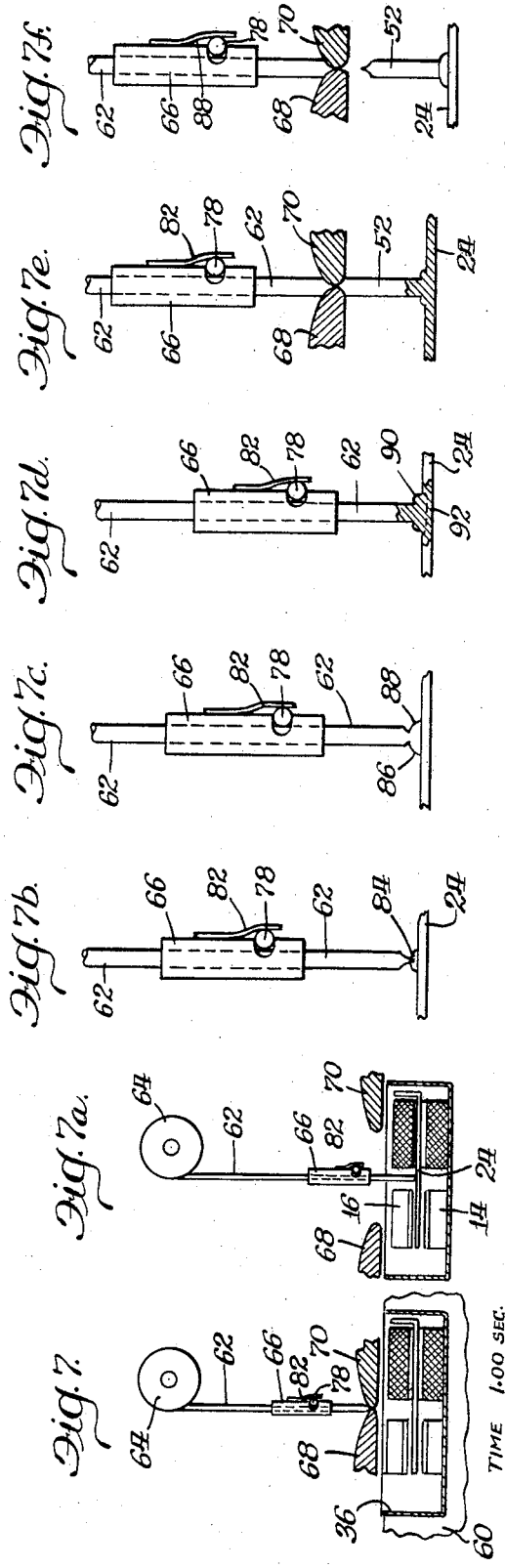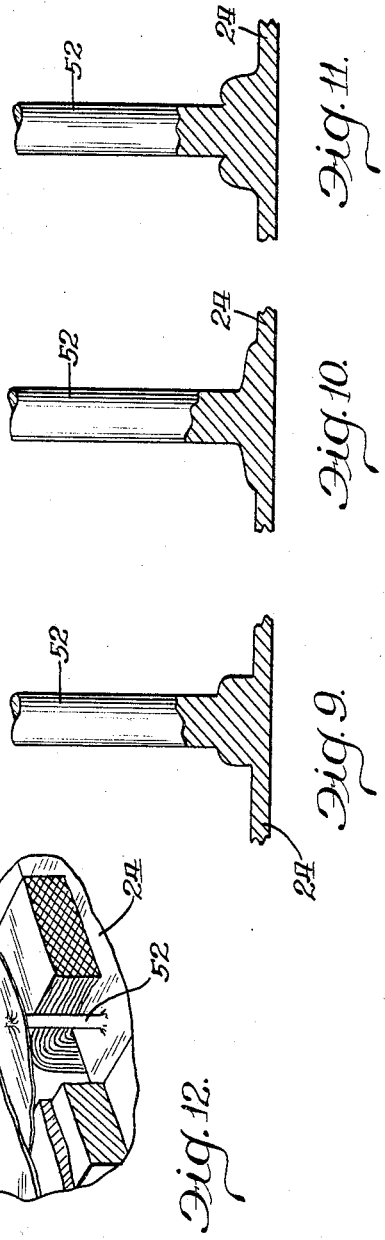

Jan. 27, 1970     E. V. CARLSON     3,491,436
METHOD OF CONNECTING DRIVE PIN TO AN ARMATURE
OF AN ELECTROACOUSTIC TRANSDUCER
Original Filed Aug. 20, 1964     3 Sheets-Sheet 3
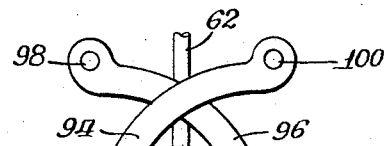
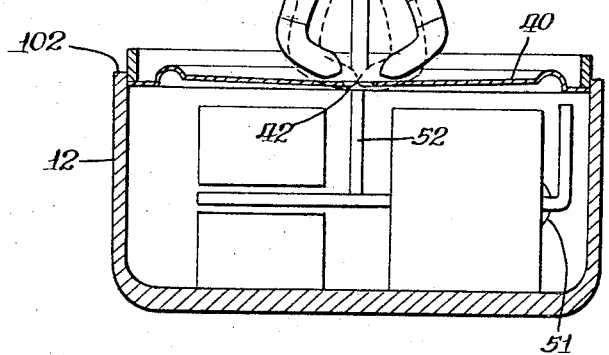
Fig. 13.
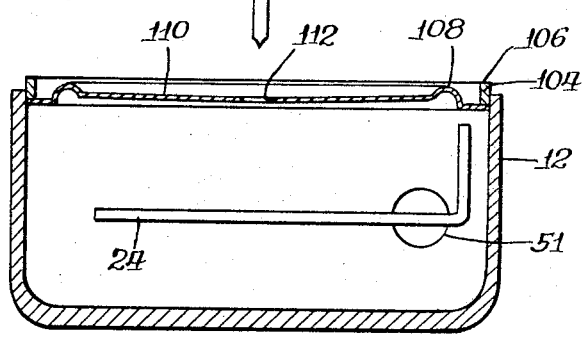
Fig. 14.
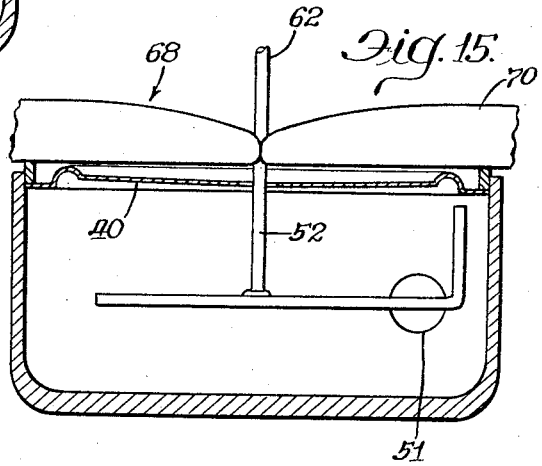
Fig. 15.
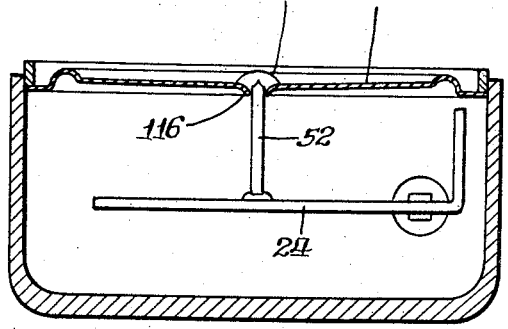
Fig. 16.
Inventor:
Elmer V. Carlson
By:
Stone, Nierman, Burmeister & Zummer
Attys.

United States Patent Office 3,491,436
Patented Jan. 27, 1970

3,491,436
METHOD OF CONNECTING DRIVE PIN TO AN ARMATURE OF AN ELECTROACOUSTIC TRANSDUCER
Elmer V. Carlson, Prospect Heights, Ill., assignor to Industrial Research Products, Inc., Elk Grove Village, Ill., a corporation of Delaware
Continuation of application Ser. No. 390,870, Aug. 20, 1964. This application Aug. 13, 1968, Ser. No. 757,202
Int. Cl. H04r 31/00
U.S. Cl. 29—594                                         8 Claims

ABSTRACT OF THE DISCLOSURE

This invention consists in a method of mounting a drive pin on an armature of an electroacoustic transducer at a point where pressure by the solid end of the drive pin may permanently alter its physical position in the transducer, which comprises the steps of forming a melt on the end of the drive pin, of connecting the drive pin and the armature to each other by the melt without substantial movement of the armature, and of solidifying the melt whereby the armature's original position in the transducer remains unimpaired.

This application is a continuation of Ser. No. 390,870, filed Aug. 20, 1964, now abandoned.

Applicant's first object is to mount a drive pin at that point on the vibratable surface of an armature permanently mounted in its motor which will be at normal transverse alignment with the center of the drive pin pole on the diaphragm which has either been mounted or will be mounted. In explanation, under present practice, a drive pin is mounted on the vibratable portion of an armature which is then assembled in the motor. The motor is then dropped into a case and a diaphragm having a prestamped central opening is mounted on the case. If the motor is not exactly centered in the case, the outer end of the drive pin will not be centered in the hole in the diaphragm. Thus, a drive pin D, see FIGURE 3, may occupy the position shown in either FIGURE 5 or 6, when the diaphragm is added. The assembler must then slightly bend the pin and in the case of the misalignment in FIGURE 6, may slightly tear the diaphragm.

Nor is this difficulty eliminated by an alternative way of connecting the armature and the diaphragm by a pin. In this method, a hole H may be cut in the armature, see FIGURE 4. This may be a plain hole or it may be threaded. After the armature has been assembled in the motor, a drive pin P, see FIGURE 4, may be seated in the hole and held there by adhesive. The pin is of predetermined length, and its lower end is dipped in adhesive. Once again, it is the positioning of the pin on the armature which causes the misalignment illustrated in FIGURES 5 and 6 when the diaphragm is added by mounting it on the case. A feature of applicant's invention is mounting the armature end of the drive pin not at a selected point on the armature, but at the vibrational center of the diaphragm with the result that the drive pin may not necessarily be centered on the armature. Broadly, applicant's method amounts to transferring adjustment of misalignment of the drive pin between the armature and the center of the hole in the diaphragm from the pin hole of the diaphragm to the flat surface of the armature.

The second object of this invention is to make the connection between the armature and the drive pin permanent so that the assembler may immediately proceed to the step of adding the diaphragm, then adding the lid, and then sealing the transducer. As will appear, applicant can position the pin as contemplated in his first object and hold it to the surface of the armature by a fast hardening cement, but setting does not proceed sufficiently rapidly. Failure to immediately harden the pin to the armature joint necessitates a hardening period or even a baking period before the next step in assembly may be taken. A feature of this invention is welding the drive pin to the armature it situ, and at a point on the armature which will be in exact normal transverse alignment with the diaphragm pin hole.

A third object of this invention is to provide a drive pin whose diaphragm end bears exactly the same relationship to the plane of the opening of the diaphragm irrespective of the position of the armature. Heretofore, drive pins, including the type D and P of FIGURES 3 and 4, have been cut to a predetermined length. If the armature in one transducer is a little closer to the plane of the diaphragm (when it is added) the pin will protrude farther through the pin hole than in the case of the transducer where the armature is farther away from the diaphragm, assuming in either case that the transducer is in magnetic balance. This may be due to slight differences in the assembly of the motor or it may be due to slight differences in the relationship of the motor to the inside case wall. This unequal penetration of the hole in the diaphragm is undesirable because it demands that more clearance be maintained between the diaphragm and the cover.

A feature of applicant's invention is that after attaching the drive pin to the armature in situ, applicant forms the welding apparatus has one electrode connected to a the drive pin in situ, i.e., cuts it to length. As will appear the welding apparatus has one electrode connected to a wire, the end of which has been welded in situ to the armature, and this wire is then cut off at a point having reference to the mounting surface of the diaphragm on the case, or with reference to the plane of the hole of the diaphragm itself. Applicant's drive pins may be of slightly different length, but the outer end always bear a fixed relationship to the outer opening in the case. Moreover, since the transducer is at this time substantially in magnetic balance, the armature's excursions up and down will tend to move the diaphragm in the same manner above its normal plane as below.

Still another object of this invention is to mount the drive pin after the diaphragm has been mounted. In one procedure, the diaphragm has a precut drive pin hold and applicant drives a weldable wire through this hole, cements or welds its outer end to the armature, and then cuts it immediately above the pin hole to form a drive pin. In a second procedure, applicant provides a diaphragm that has no drive pin hole. The outer end of the drive pin to be is punched through the central part of the diaphragm, welded to the armature, cut off above the diaphragm, and a drop of cement added. As will appear, the cutting off of the wire is done by cutters so shaped as to provide a feather edge on the top of the mounted pin just formed and on the bottom of the end of the wire which will be welded to the armature of the next transducer. This feather edge acts as a cutter itself when one drives it through the diaphragm.

These and such other objects as may hereinafter appear are attained in the embodiment of the invention described in connection with the accompanying drawings, wherein:

FIGURE 1 is a sectional view (taken on the line 1—1 of FIGURE 2) showing the essential parts of the transducer having an E-armature shown in copending application Ser. No. 352,462, filed Mar. 17, 1964 now Patent No. 3,347,991, by Carlson with applicant's improved drive pin mounted therein;

FIGURE 2 is a view taken on the line 2—2 of FIGURE 1;

FIGURES 3 and 4 are schematic views showing two common existing drive pins, for the purpose of illustrating misalignment of drive pins in FIGURES 5 and 6, which are plan views of the area 11 in FIGURE 2;

FIGURES 7 through 7f are schematic views showing the steps of applicant's process;

FIGURE 8 is an enlargement of a portion of FIGURE 7;

FIGURES 9, 10 and 11 show sections of typical welds obtained;

FIGURE 12 is a perspective view of the central portion of a transducer cut away so that the drive pin and its connection to both the armature and the diaphragm may be seen;

FIGURE 13 is a side elevation of cutters which will sever the drive pin from the wire below the plane of the opening of the transducer case;

FIGURES 14 and 15 are schematic illustrations of practicing the method when a diaphragm having a drive pin hole therein has been mounted on the case before the drive pin has been affixed to the armature; and, FIGURES 16 illustrates a method of adding a drive pin to an imperforate diaphragm.

Applicant's transducer is shown in FIGURES 1 and 2. The motor of the transducer is generally identified by the numeral 10 and consists of a magnetic casing or cup 12 in which is positioned two magnets 14 and 16 spaced from each other by pole pieces 18 and 20, and by a working gap 22. This gap is maintained by spacers at opposite ends of an E-shaped armature 24 wherein the base 26 of the armature is at right angles to the plane of the armature itself. The E-shaped armature is composed of outside arms 28 and 30 whose ends are fixed by the same spacers not shown between the magnets 14 and 16. The middle arm 32 is free to vibrate in the working gap 22. The polarity of the magnets 14 and 16 is as shown and the outer pole of the magnet 16 engages a bulkhead 34 made of magnetic material which is in flux-conductive engagement with a flux-conductive case 36. The direct flux circuit is completed by the case 36, bulkhead 34, two magnets 14 and 16, pole pieces 18 and 20, and two fixed gaps (not shown) and the working gap 22. Mounted on a rectangular frame 38 is a diaphragm 40 having a central drive pin hole 42. This frame fits snugly against the bulkhead 34 and within the case 36. A lid 44 having a sound port 46 is mounted on the open side of the case 36 by cement and forms a front acoustic cavity 48. The back or motor cavity is identified by the numeral 50. The numeral 51 identifies an adjust hole in the rear wall of the case 36. The components thus far described constitute the essential elements (excepting for the drive pin) of the acoustic transducer described in copending application, Ser. No. 298,332, filed July 29, 1963, now Patent No. 3,313,892, by Mostardo et al.

A feature of applicant's transducer is the drive pin 52 which is circular in cross section, see FIGURE 2, is welded to the armature 24 at 54, has an end 56 at a selected level with reference to the upper edge 58 of the case 36 or the mounting frame 38. The drive pin may be made of any material which may be welded, brazed, etc., in situ, to the armature. Applicant uses a material which also has low flux-conductive properties; namely, a nickel steel such as stainless, 18% chromium, 8% nickel. High tensile strength is desirable. The end 56 penetrates the drive pin hole 42 of the diaphragm. A drop of cement holds the end 56 of the drive pin 52 to the diaphragm 40.

The first method of making the transducer shown in FIGURES 1 and 2 is as follows. The component parts, excepting for the lid 44, diaphragm 40 and drive pin 52, are assembled as shown. Tolerances of .005" (five thousandths) are prescribed and hence the parts may be assembled rapidly. The motors need not seat uniformly in the cases. The motors are magnetically balanced.

The operator places the case with the open side of the upward motor cavity 50 in a jig or holder 60. Only those structural elements are shown which assist in understanding the steps of operation and their sequence, and then only schematically. A stainless steel wire 62 from a spool 64 is fed downwardly through a chuck 66 to a point lying in a plane immediately above a plane adjacent the upper edge of the open-sided case 36. A pair of horizontally reciprocatable cutters 68 and 70 operate in this plane. Their jaws are such that they form feather edges on each of the adjacent ends of the cut wire—see FIGURES 14 and 7f.

The operator, referring to FIGURE 8, next temporarily affixes a clamp 72 through the opening 51 to the armature 24. This clamp 72 is connected to a conductor 74, which is connected to one output of a percussion welder 76. The other output of the welder 76 is connected to an electrode 78 which is positioned in a transverse opening 85 in the chuck 66 and held against the stainless steel wire 62 by a spring 82. The percussion welder 76 forms no part of the invention which is the subject of this application.

The chuck 66 and transducer 36 are shown in FIGURE 7 at the beginning of a cycle. The motor in the case 36 without a diaphragm is in the jig 60 and the wire 62 is engaged by the cutters 68 and 70. They shortly before severed the lower part of the wire from the main body 62 to form a drive pin in the transducer previously in the jig 60. In the first step, the cutters 68 and 70 retract from each other as shown in FIGURE 7a, while simultaneously the chuck 66 moves down. The lower end of the wire 62 fuses to the armature 24. This is done by discharging a condenser in the welder 76 a few microseconds before the lower end of wire 62 engages the armature 24. What occurs is that when the feather point 84, see FIGURE 7b, closely approaches the armature 24, an arc develops and melts the material. Once the arc is struck, a comparatively low voltage is sufficient to bridge the gap between the melting end of the wire 62 and the armature 24. The stroke of the chuck 66 is constant and will force the end portion of the wire 62 into engagement with the armature 24. At the end of the current flow, the chuck 66 slides along the wire until it reaches its lowermost point.

Applicant illustrates what is believed to happen in FIGURES 7c through 7e. The curved lines 86 and 88 show the outside limits of the arc which is fusing the metal at the lower end of the wire 62. Momentarily a metallic pool 90 is formed of the material of rod 62, see FIGURE 7b. Also, as indicated by the dash line 92, there is a slight fusion of the surface of the armature at 24. The duration of the current flow is in microseconds. Most importantly, the solidifying of the fused material is in tenths of a second. In FIGURE 7e, the cutters 68 and 70 have pinched off the pin 52 from the main body of the wire 62. Thereupon, the jig 60 of FIGURE 7 moves downwardly freeing the pin 52 of the cutters.

FIGURES 9, 10 and 11 show cross sections of welds which differ from each other due to welding currents of different duration and slightly different impacts by the wire 62 with the armature 24.

FIGURES 7 through 7f are steps taken during a period of one-half second. Referring to FIGURES 7f and 7, in 7f the transducer is ready to be withdrawn. Upon replacement by the next transducer, the original position 7 is attained and the next cycle may commence.

Upon the completion of the positioning of the pin 52 on the armature 24, the transducer 10, referring to FIGURE 1, is removed from the jig and at another station has placed within it a diaphragm assembly held by the ring 38. Accurate mounting of the diaphragm will center the drive pin 52 in the hole 42. Moreover, the drive pin 52 will penetrate the hole 42 by about the same distance for all transducers so assembled. The next steps are to add the adhesive and the lid 44.

In some applications, it is desirable to have the outer end of the pin 52, that is, the tip of its upper feather point, substantially in the plane of the diaphragm to be added. In FIGURE 13, applicant shows a pair of cutters 94 and 96 pivoted respectively at 98 and 100. The clipping action occurred before the diaphragm 40 was positioned over the motor cavity. The figure illustrates that cutters which move downwardly toward each other can clip the wire 62 in the plane of the opening 42 in the diaphragm which is to be added even though the cut is inside the plane of the top opening of the case. As explained above, the horizontal cutters 68 and 70 are registered with respect to the upper edge 102 of the case 12. They cannot snip below the plane of the edge 102. The cutters 94 and 96, shown in FIGURE 13, can do this.

A second method of assembling the drive pin on the armature 24 is shown in FIGURES 14 and 15. In this construction, the ring 104 of the diaphragm assembly has its upper edge 106 in approximately the plane of the top of the surround 108 of the diaphragm 110. The procedures described with reference to FIGURES 7 and 7f are followed, excepting that in this method the diaphragm assembly is mounted on the open side of the case 12. The diaphragm has an opening 112. The steps are identical, excepting that this time the uncut end of the wire 62 passes through the opening 112, is welded to the armature 24, as shown in FIGURE 15, and the knives 68 and 70 cut off the lower end of the wire 62 to form the pin 52.

In the procedures thus far described, the adjustment port 51 remains open so that the operator may with an appropriate tool give a desired set to the armature after the outer end of the drive pin 52 has been adhered by cement to the diaphragm 40—should this be desired.

The last method of assembling applicant's drive pin is illustrated in FIGURE 16. Referring to this figure, the transducer is shown as in FIGURE 7e. It differs from 7e and from FIGURE 14 in that the diaphragm 114 has no central opening and when mounted forms a sealed back cavity as suggested in FIGURE 14. The diaphragm is electrically conductive but insulated from the case, and the steps of FIGURES 7 through 7f are followed, but in this instance, the lower end of the wire 62 punches a hole through the diaphragm 114 so that the jagged edges 116 of the hole press against the wire as it moves down to have its lower end welded to armature 24. The drive pin is cut off from the wire 62. The transducer is removed to another station where a drop of cement 118 adheres the upper tip of the pin 52 to the diaphragm 114.

While applicant has referred to three methods for affixing a drive pin to an armature mounted in a motor, basically there is just one method. Its first step is attaching one end of a wire to an armature already mounted in a magnetically balanced motor—and this by any means— or more specifically by welding metal to metal. The second step is severing the wire at a point which will leave a drive pin whose outer end will lie in the center of the opening of a diaphragm when mounted. The final step is mounting the diaphragm and attaching the pin. The process may be summarized by saying that the drive pin is both formed and attached to the armature in situ in the motor.

The second method differs from the first only in that the diaphragm with a precut hole is mounted on the motor and case before the steps of attaching and forming the drive pin. The third method is the same as the second method excepting that there is no pole in the mounted diaphragm. The lower end of the wire which will become the armature end of the drive pin pierces the fragile diaphragm as the mounting and formation steps occur.

Having thus described his invention, what applicant claims is:

1. The method of attaching an electrically conductive drive pin to an electrically conductive armature of a magnetically balanced electroacoustic transducer at a vibratable portion of the armature where pressure by the solid end of the pin might permanently alter its physical position in the transducer and upset the magnetic balance, which comprises the steps of advancing the end of the pin toward the armature, of closing an electric circuit through the pin and the armature to form a melt of the end of the pin, of engaging the surface of the armature with the melt, of simultaneously opening the circuit, and of stopping the advance of the pin before its solid portion moves the armature from its initial at rest position.

2. The method of claim 1 wherein the drive pin is initially the end of a length of wire and wherein the final step of the method after welding the end of the pin to the armature is cutting the drive pin from the length of wire at a point where the cut end will be attached to a diaphragm.

3. The method of claim 2 which includes an initial step of placing the transducer in an opensided-case, the periphery of the opening lying in a plane in or immediately adjacent to which a diaphragm is to be mounted, and of a subsequent step of gauging the tools for cutting off the drive pin on the peripheral opening of the case.

4. The method of any one of claims 2 and 3 which includes an initial step of forming a feather point on the end of the pin to promote formation of the arc that melts the end of the drive pin.

5. The method of claims 1, 2, 3 or 4 which includes the step of magnetically balancing the armature of the transducer before commencing the steps of any one of said claims.

6. The method of claims 1, 2, 3, 4 or 5 which includes the step of attaching a diaphragm to the free end of the drive pin.

7. The method of attaching a drive pin to an armature which comprises the steps of mounting an armature-type transducer in a case having a side opening, there being a passageway connecting a point on the armature where pressure may permanently alter its physical position in the transducer to the opening in the case, of mounting a diphragm having a hole therein over said opening so that said hole is in alignment with said passageway, of thereafter performing the steps of claim 2, and of attaching the free end of the drive pin to the wall of the hole in the diphragm.

8. The method of attaching a drive pin to an armature which comprises the steps of mounting an armature-type transducer in a case having a side opening, there being a passageway connecting a point on the armature where pressure may permanently alter its physical position in the transducer to the opening in the case, of mounting an imperforate diaphragm over said opening, of puncturing the diaphragm in alignment with the passageway by one end of a drive pin, of thereafter performing the steps of claim 2, and of the attaching the free end of the drive pin to the wall of the hole pierced in the diaphragm.

References Cited

UNITED STATES PATENTS

| | | | |
|---|---|---|---|
| 2,685,630 | 8/1954 | Graham | 219—95 |
| 3,073,946 | 1/1963 | Hazel | 219—95 |
| 3,156,966 | 11/1964 | Houda et al. | 219—95 X |
| 3,313,892 | 4/1967 | Mostardo et al. | 179—115 |

JOHN F. CAMPBELL, Primary Examiner

D. C. RILEY, Assistant Examiner

U.S. Cl. X.R.

29—595; 219—95

PO-1050
(5/69)

UNITED STATES PATENT OFFICE
CERTIFICATE OF CORRECTION

Patent No. 3,491,436              Dated January 27, 1970

Inventor(s) Elmer V. Carlson

It is certified that error appears in the above-identified patent and that said Letters Patent are hereby corrected as shown below:

Column 2, line 30, delete in toto; line 46, change "hold" to --hole--.

SIGNED AND SEALED

JUN 16 1970

(SEAL)
Attest:

Edward M. Fletcher, Jr.
Attesting Officer

WILLIAM E. SCHUYLER, JR
Commissioner of Patents